March 11, 1924.  H. N. NILSSEN  1,486,676

FISHING VEST

Filed April 16, 1923

Inventor:
HANS N. NILSSEN
Atty.

Patented Mar. 11, 1924.

1,486,676

UNITED STATES PATENT OFFICE.

HANS N. NILSSEN, OF DULUTH, MINNESOTA.

FISHING VEST.

Application filed April 16, 1923. Serial No. 632,307.

*To all whom it may concern:*

Be it known that I, HANS N. NILSSEN, a citizen of the United States, residing at Duluth, in the county of St. Louis and State of Minnesota, have invented certain new and useful Improvements in Fishing Vests, of which the following is a specification, reference being had therein to the accompanying drawing.

This invention relates to sportsmen's apparel and has particular reference to a vest designed to be worn while one is fishing.

The principal object of the invention is to provide such a vest for sportsmen's use that contains the requisites for fishing distributed in a neat and convenient manner about the body of the wearer so as to be carried easily and without interfering with the handling of a fishing rod, and providing storage pockets for the convenient carrying of fish, game or other articles.

Other objects and advantages of the invention will appear in the further description of the invention.

Referring now to the accompanying drawing forming part of this application, and in which like reference characters indicate like parts;

1 represents the vest, which is of the usual shape, and having the arm holes 2 and 3 therein; the garment as here illustrated now being provided with sleeves, though as will be obvious the addition of sleeves would in no wise interfere with the purpose of the invention.

Figure 1:
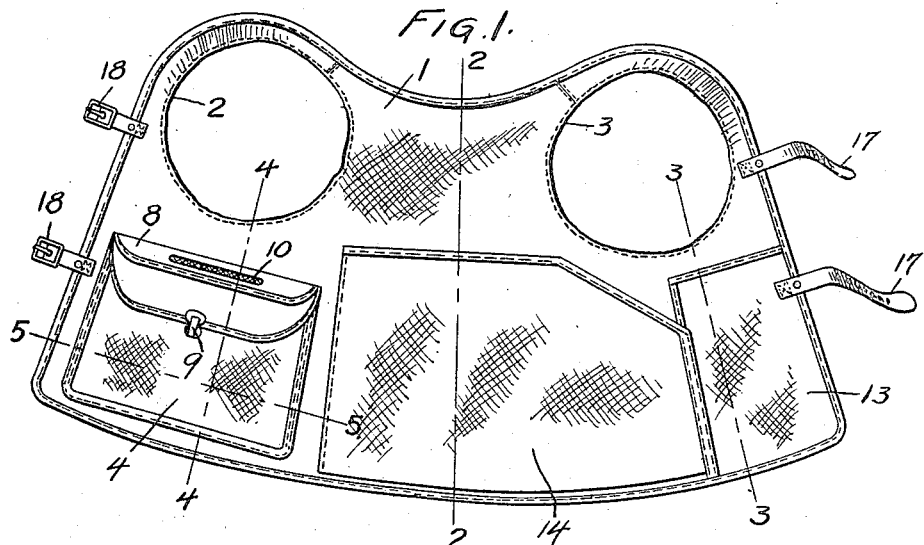
Figure 1 represents an extended perspective view of my improved fishing vest.
Figure 5:
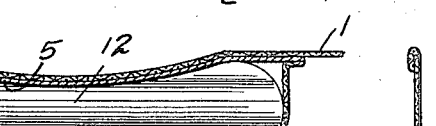
Figure 5 is a section on the line 5—5, Fig. 1.
Figure 3:
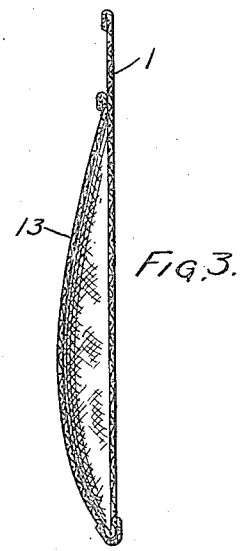
Figure 3 is a section on the line 3—3, Fig. 1.
Figure 2:
Figure 2 is a section on the line 2—2, Fig. 1.
Figure 4:
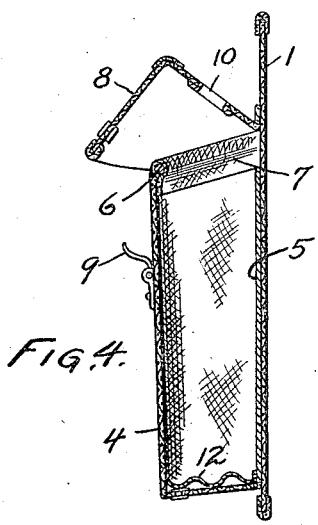
Figure 4 is a section on the line 4—4, Fig. 1.

To the lower left hand corner of the vest is securely attached as by sewing or the like, the fish basket 4, and the side next adjacent to the vest is provided with a rubber lining, the same being illustrated at 5. The upper open end of the fish basket is provided with an annular wire 6, which is enclosed within the upper end of the basket in any suitable manner, such as illustrated at 7, to preserve the shape thereof. The cover 8 of the basket is made to overlap same as is common and is held in closed position by means of the suitable buckle 9 fixed to the outer wall of the basket. A hole 10 is cut in the cover so that the fish may be placed therethrough into the basket. The bottom of the basket is made to incline slightly as shown in Figure 4 and adjacent the lower outer corner thereof are formed a number of drain holes 11 so that the water may drip therethrough to the ground as it runs from the fish or other articles carried in the basket. Loosely fitted upon the bottom of the basket is the corrugated piece of sheet metal 12, the same being concaved on the inner side thereof to more snugly fit about the body of the person wearing the vest, and which will aid in draining the water from the articles within the basket. The sides and bottom of the basket are gussetted so that when not in use the basket will fold snugly against the side of the vest.

Adjacent the right hand corner of the vest is secured the pocket 13, the sides and bottom of the same being stitched to the vest, but the top left open for convenient access thereto and in this pocket may be carried extra fishing tackle or other paraphernalia usually included in a fisherman's equipment.

Intermediate of the basket and pocket is securely stitched to the vest the much larger pocket 14, one upper corner of which is cut away slightly as at 15, and which corner is not stitched to the vest through which access thereto may be had. The sides and bottom of this pocket are also gussetted as at 16 to permit expansion of the pocket and the carrying of larger quantities of supplies which may include camp equipment, food, etc.

The vest is worn in the usual manner and the straps 17 may be held in the buckles 18 to make the vest secure about the body of the wearer, and in this manner a vest is provided to care for all the ordinary needs of a fisherman and the weight thereof is evenly distributed upon the body, drawing alike at both shoulders.

Having thus described my invention, what I claim and desire to secure by Letters Patent, is:

1. The combination with a vest of the class described of a fish basket permanently fixed thereto, a removable metal bottom within said basket, and drain holes within the bottom of the basket in the outermost edge thereof beneath the removable bottom.

2. The combination with a vest of the class described of a fish basket permanently fixed thereto having drain holes in the edge of the bottom remote from the vest, a removable corrugated sheet metal bottom within said basket, said bottom being arcuate in form to comfortably fit the wearer.

In testimony whereof I hereunto affix my signature.

HANS N. NILSSEN.